(12) United States Patent
Lesso

(10) Patent No.: US 11,227,609 B2
(45) Date of Patent: Jan. 18, 2022

(54) ANALYSING SPEECH SIGNALS

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 107 days.

(21) Appl. No.: 16/156,263

(22) Filed: Oct. 10, 2018

(65) Prior Publication Data

US 2019/0115032 A1 Apr. 18, 2019

Related U.S. Application Data

(60) Provisional application No. 62/571,978, filed on Oct. 13, 2017.

(30) Foreign Application Priority Data

Nov. 28, 2017 (GB) ..................................... 1719731

(51) Int. Cl.
*G10L 17/22* (2013.01)
*G10L 17/02* (2013.01)
(Continued)

(52) U.S. Cl.
CPC .............. *G10L 17/22* (2013.01); *G10L 17/00* (2013.01); *G10L 17/02* (2013.01); *G10L 17/06* (2013.01);
(Continued)

(58) Field of Classification Search
CPC ....... G10L 17/00; G10L 17/005; G10L 17/06; G10L 17/22; G10L 25/48; G10L 25/51; G10L 25/84; G10L 25/87; G10L 25/93
See application file for complete search history.

(56) References Cited

U.S. PATENT DOCUMENTS 5,197,113 A * 3/1993 Mumolo ................. G10L 25/93
704/200
5,568,559 A 10/1996 Makino
(Continued)

FOREIGN PATENT DOCUMENTS

| AU | 2015202397 B2 | 5/2015 |
|---|---|---|
| CN | 1937955 A | 3/2007 |

(Continued)

OTHER PUBLICATIONS

International Search Report and Written Opinion of the International Searching Authority, International Application No. PCT/GB2019/050185, dated Apr. 2, 2019.
(Continued)

*Primary Examiner* — Paras D Shah
(74) *Attorney, Agent, or Firm* — Jackson Walker L.L.P.

(57) ABSTRACT

A method of analysis of an audio signal comprises: receiving an audio signal representing speech; extracting first and second components of the audio signal representing first and second acoustic classes of the speech respectively; analysing the first and second components of the audio signal with models of the first and second acoustic classes of the speech of an enrolled user. Based on the analysing, information is obtained information about at least one of a channel and noise affecting the audio signal.

7 Claims, 11 Drawing Sheets

(51) Int. Cl.
  *G10L 25/84* (2013.01)
  *G10L 17/06* (2013.01)
  *G10L 25/51* (2013.01)
  *G10L 17/00* (2013.01)
  *G10L 25/48* (2013.01)
  *G10L 25/30* (2013.01)
  *G10L 25/18* (2013.01)
  *G10L 25/93* (2013.01)

(52) U.S. Cl.
  CPC .............. *G10L 25/48* (2013.01); *G10L 25/51* (2013.01); *G10L 25/84* (2013.01); *G10L 25/18* (2013.01); *G10L 25/30* (2013.01); *G10L 25/93* (2013.01)

(56) References Cited

U.S. PATENT DOCUMENTS

| | | | |
|---|---|---|---|
| 5,710,866 A * | 1/1998 | Alleva | G10L 15/10 704/246 |
| 5,787,187 A | 7/1998 | Bouchard et al. | |
| 5,838,515 A | 11/1998 | Mortazavi et al. | |
| 6,182,037 B1 | 1/2001 | Maes | |
| 6,229,880 B1 | 5/2001 | Reformato et al. | |
| 6,343,269 B1 * | 1/2002 | Harada | G10L 15/24 704/243 |
| 6,480,825 B1 | 11/2002 | Sharma et al. | |
| 7,016,833 B2 | 3/2006 | Gable et al. | |
| 7,039,951 B1 | 5/2006 | Chaudhari et al. | |
| 7,418,392 B1 | 8/2008 | Mozer et al. | |
| 7,492,913 B2 | 2/2009 | Connor et al. | |
| 8,442,824 B2 | 5/2013 | Aley-Raz et al. | |
| 8,489,399 B2 | 7/2013 | Gross | |
| 8,577,046 B2 | 11/2013 | Aoyagi | |
| 8,856,541 B1 | 10/2014 | Chaudhury et al. | |
| 8,997,191 B1 | 3/2015 | Stark et al. | |
| 9,049,983 B1 | 6/2015 | Baldwin | |
| 9,171,548 B2 | 10/2015 | Velius et al. | |
| 9,305,155 B1 | 4/2016 | Vo et al. | |
| 9,317,736 B1 | 4/2016 | Siddiqui | |
| 9,390,726 B1 | 7/2016 | Smus et al. | |
| 9,430,629 B1 | 8/2016 | Ziraknejad et al. | |
| 9,484,036 B2 | 11/2016 | Kons et al. | |
| 9,548,979 B1 | 1/2017 | Johnson et al. | |
| 9,600,064 B2 | 3/2017 | Lee et al. | |
| 9,641,585 B2 | 5/2017 | Kvaal et al. | |
| 9,646,261 B2 | 5/2017 | Agrafioti et al. | |
| 9,659,562 B2 | 5/2017 | Lovitt | |
| 9,665,784 B2 | 5/2017 | Derakhshani et al. | |
| 9,984,314 B2 | 5/2018 | Philipose et al. | |
| 9,990,926 B1 | 6/2018 | Pearce | |
| 10,032,451 B1 | 7/2018 | Mamkina et al. | |
| 10,063,542 B1 | 8/2018 | Kao | |
| 10,079,024 B1 | 9/2018 | Bhimanaik et al. | |
| 10,097,914 B2 | 10/2018 | Petrank | |
| 10,192,553 B1 * | 1/2019 | Chenier | G10L 15/22 |
| 10,204,625 B2 | 2/2019 | Mishra et al. | |
| 10,210,685 B2 | 2/2019 | Borgmeyer | |
| 10,255,922 B1 | 4/2019 | Sharifi et al. | |
| 10,277,581 B2 | 4/2019 | Chandrasekharan et al. | |
| 10,305,895 B2 | 5/2019 | Barry et al. | |
| 10,318,580 B2 | 6/2019 | Topchy et al. | |
| 10,334,350 B2 | 6/2019 | Petrank | |
| 10,460,095 B2 | 10/2019 | Boesen | |
| 10,467,509 B2 | 11/2019 | Albadawi et al. | |
| 10,692,492 B2 | 6/2020 | Rozen et al. | |
| 10,733,987 B1 | 8/2020 | Govender et al. | |
| 10,915,614 B2 | 2/2021 | Lesso | |
| 10,977,349 B2 | 4/2021 | Suh et al. | |
| 11,017,252 B2 | 5/2021 | Lesso | |
| 11,023,755 B2 | 6/2021 | Lesso | |
| 2002/0194003 A1 | 12/2002 | Mozer | |
| 2003/0033145 A1 | 2/2003 | Petrushin | |
| 2003/0177006 A1 | 9/2003 | Ichikawa et al. | |
| 2003/0177007 A1 | 9/2003 | Kanazawa et al. | |
| 2003/0182119 A1 | 9/2003 | Junqua et al. | |
| 2004/0030550 A1 | 2/2004 | Liu | |
| 2004/0141418 A1 | 7/2004 | Matsuo et al. | |
| 2004/0230432 A1 * | 11/2004 | Liu | G10L 15/28 704/254 |
| 2005/0060153 A1 | 3/2005 | Gable et al. | |
| 2005/0171774 A1 | 8/2005 | Applebaum et al. | |
| 2006/0116874 A1 | 6/2006 | Samuelsson et al. | |
| 2006/0171571 A1 | 8/2006 | Chan et al. | |
| 2007/0055517 A1 | 3/2007 | Spector | |
| 2007/0129941 A1 | 6/2007 | Tavares | |
| 2007/0185718 A1 | 8/2007 | Di Mambro et al. | |
| 2007/0233483 A1 * | 10/2007 | Kuppuswamy | G10L 17/20 704/247 |
| 2007/0250920 A1 | 10/2007 | Lindsay | |
| 2008/0071532 A1 | 3/2008 | Ramakrishnan et al. | |
| 2008/0082510 A1 | 4/2008 | Wang et al. | |
| 2008/0223646 A1 | 9/2008 | White | |
| 2008/0262382 A1 | 10/2008 | Akkermans et al. | |
| 2008/0285813 A1 | 11/2008 | Holm | |
| 2009/0087003 A1 | 4/2009 | Zurek et al. | |
| 2009/0105548 A1 | 4/2009 | Bart | |
| 2009/0167307 A1 | 7/2009 | Kopp | |
| 2009/0232361 A1 | 9/2009 | Miller | |
| 2009/0281809 A1 | 11/2009 | Reuss | |
| 2009/0319270 A1 | 12/2009 | Gross | |
| 2010/0004934 A1 | 1/2010 | Hirose et al. | |
| 2010/0076770 A1 | 3/2010 | Ramaswamy | |
| 2010/0204991 A1 | 8/2010 | Ramakrishnan et al. | |
| 2010/0328033 A1 | 12/2010 | Kamei | |
| 2011/0051907 A1 | 3/2011 | Jaiswal et al. | |
| 2011/0142268 A1 | 6/2011 | Iwakuni et al. | |
| 2011/0246198 A1 | 10/2011 | Asenjo et al. | |
| 2011/0276323 A1 * | 11/2011 | Seyfetdinov | G06F 21/32 704/207 |
| 2011/0314530 A1 | 12/2011 | Donaldson | |
| 2011/0317848 A1 | 12/2011 | Ivanov et al. | |
| 2012/0110341 A1 | 5/2012 | Beigi | |
| 2012/0223130 A1 | 9/2012 | Knopp et al. | |
| 2012/0224456 A1 | 9/2012 | Visser et al. | |
| 2012/0249328 A1 | 10/2012 | Xiong | |
| 2012/0323796 A1 | 12/2012 | Udani | |
| 2013/0024191 A1 * | 1/2013 | Krutsch | G10L 21/038 704/205 |
| 2013/0058488 A1 | 3/2013 | Cheng et al. | |
| 2013/0080167 A1 | 3/2013 | Mozer | |
| 2013/0225128 A1 | 8/2013 | Gomar | |
| 2013/0227678 A1 | 8/2013 | Kang | |
| 2013/0247082 A1 | 9/2013 | Wang et al. | |
| 2013/0279297 A1 | 10/2013 | Wulff et al. | |
| 2013/0279724 A1 | 10/2013 | Stafford et al. | |
| 2013/0289999 A1 | 10/2013 | Hymel | |
| 2014/0059347 A1 | 2/2014 | Dougherty et al. | |
| 2014/0149117 A1 * | 5/2014 | Bakish | G10L 15/24 704/248 |
| 2014/0172430 A1 | 6/2014 | Rutherford et al. | |
| 2014/0188770 A1 | 7/2014 | Agrafioti et al. | |
| 2014/0237576 A1 | 8/2014 | Zhang et al. | |
| 2014/0241597 A1 | 8/2014 | Leite | |
| 2014/0293749 A1 | 10/2014 | Gervaise | |
| 2014/0307876 A1 | 10/2014 | Agiomyrgiannakis et al. | |
| 2014/0330568 A1 | 11/2014 | Lewis et al. | |
| 2014/0337945 A1 | 11/2014 | Jia et al. | |
| 2014/0343703 A1 | 11/2014 | Topchy et al. | |
| 2015/0006163 A1 * | 1/2015 | Liu | G10L 19/083 704/205 |
| 2015/0028996 A1 | 1/2015 | Agrafioti et al. | |
| 2015/0033305 A1 | 1/2015 | Shear et al. | |
| 2015/0036462 A1 | 2/2015 | Calvarese | |
| 2015/0088509 A1 | 3/2015 | Gimenez et al. | |
| 2015/0089616 A1 | 3/2015 | Brezinski et al. | |
| 2015/0112682 A1 | 4/2015 | Rodriguez et al. | |
| 2015/0134330 A1 | 5/2015 | Baldwin et al. | |
| 2015/0161370 A1 | 6/2015 | North et al. | |
| 2015/0161459 A1 | 6/2015 | Boczek | |
| 2015/0168996 A1 | 6/2015 | Sharpe et al. | |
| 2015/0245154 A1 | 8/2015 | Dadu et al. | |
| 2015/0261944 A1 | 9/2015 | Hosom et al. | |
| 2015/0276254 A1 | 10/2015 | Nemcek et al. | |

(56) References Cited

U.S. PATENT DOCUMENTS

| | | | |
|---|---|---|---|
| 2015/0301796 A1* | 10/2015 | Visser | G10L 17/08 715/728 |
| 2015/0332665 A1 | 11/2015 | Mishra et al. | |
| 2015/0347734 A1 | 12/2015 | Beigi | |
| 2015/0356974 A1 | 12/2015 | Tani et al. | |
| 2015/0371639 A1 | 12/2015 | Foerster et al. | |
| 2016/0007118 A1 | 1/2016 | Lee et al. | |
| 2016/0026781 A1 | 1/2016 | Boczek | |
| 2016/0066113 A1 | 3/2016 | Elkhatib et al. | |
| 2016/0071275 A1 | 3/2016 | Hirvonen | |
| 2016/0071516 A1 | 3/2016 | Lee et al. | |
| 2016/0086607 A1 | 3/2016 | Aley-Raz et al. | |
| 2016/0086609 A1 | 3/2016 | Yue et al. | |
| 2016/0111112 A1 | 4/2016 | Hayakawa | |
| 2016/0125877 A1 | 5/2016 | Foerster et al. | |
| 2016/0125879 A1 | 5/2016 | Lovitt | |
| 2016/0147987 A1 | 5/2016 | Jang et al. | |
| 2016/0182998 A1 | 6/2016 | Galal et al. | |
| 2016/0210407 A1 | 7/2016 | Hwang et al. | |
| 2016/0217321 A1 | 7/2016 | Gottleib | |
| 2016/0217795 A1 | 7/2016 | Lee et al. | |
| 2016/0234204 A1 | 8/2016 | Rishi et al. | |
| 2016/0314790 A1 | 10/2016 | Tsujikawa et al. | |
| 2016/0324478 A1 | 11/2016 | Goldstein | |
| 2016/0330198 A1 | 11/2016 | Stern et al. | |
| 2016/0371555 A1 | 12/2016 | Derakhshani | |
| 2016/0372139 A1 | 12/2016 | Cho et al. | |
| 2017/0011406 A1 | 1/2017 | Tunnell et al. | |
| 2017/0049335 A1 | 2/2017 | Duddy | |
| 2017/0068805 A1 | 3/2017 | Chandrasekharan et al. | |
| 2017/0078780 A1 | 3/2017 | Qian et al. | |
| 2017/0110117 A1 | 4/2017 | Chakladar et al. | |
| 2017/0110121 A1 | 4/2017 | Warford et al. | |
| 2017/0112671 A1 | 4/2017 | Goldstein | |
| 2017/0116995 A1 | 4/2017 | Ady et al. | |
| 2017/0134377 A1 | 5/2017 | Tokunaga et al. | |
| 2017/0150254 A1 | 5/2017 | Bakish et al. | |
| 2017/0161482 A1 | 6/2017 | Eltoft et al. | |
| 2017/0162198 A1 | 6/2017 | Chakladar et al. | |
| 2017/0169828 A1 | 6/2017 | Sachdev | |
| 2017/0200451 A1 | 7/2017 | Booklet et al. | |
| 2017/0213268 A1 | 7/2017 | Puehse et al. | |
| 2017/0214687 A1 | 7/2017 | Klein et al. | |
| 2017/0231534 A1 | 8/2017 | Agassy et al. | |
| 2017/0243597 A1 | 8/2017 | Braasch | |
| 2017/0256270 A1 | 9/2017 | Singaraju et al. | |
| 2017/0279815 A1 | 9/2017 | Chung et al. | |
| 2017/0287490 A1* | 10/2017 | Biswal | G10L 15/20 |
| 2017/0293749 A1 | 10/2017 | Baek et al. | |
| 2017/0323644 A1 | 11/2017 | Kawato | |
| 2017/0347180 A1 | 11/2017 | Petrank | |
| 2017/0347348 A1 | 11/2017 | Masaki et al. | |
| 2017/0351487 A1* | 12/2017 | Aviles-Casco Vaquero | G06F 3/167 |
| 2017/0373655 A1 | 12/2017 | Mengad et al. | |
| 2018/0018974 A1 | 1/2018 | Zass | |
| 2018/0032712 A1 | 2/2018 | Oh et al. | |
| 2018/0039769 A1 | 2/2018 | Saunders et al. | |
| 2018/0047393 A1 | 2/2018 | Tian et al. | |
| 2018/0060552 A1 | 3/2018 | Pellom et al. | |
| 2018/0060557 A1 | 3/2018 | Valenti et al. | |
| 2018/0096120 A1 | 4/2018 | Boesen | |
| 2018/0107866 A1 | 4/2018 | Li et al. | |
| 2018/0108225 A1 | 4/2018 | Mappus et al. | |
| 2018/0113673 A1 | 4/2018 | Sheynblat | |
| 2018/0121161 A1 | 5/2018 | Ueno et al. | |
| 2018/0146370 A1 | 5/2018 | Krishnaswamy et al. | |
| 2018/0166071 A1 | 6/2018 | Lee et al. | |
| 2018/0174600 A1 | 6/2018 | Chaudhuri et al. | |
| 2018/0176215 A1 | 6/2018 | Perotti et al. | |
| 2018/0187969 A1 | 7/2018 | Kim et al. | |
| 2018/0191501 A1 | 7/2018 | Lindemann | |
| 2018/0232201 A1 | 8/2018 | Holtmann | |
| 2018/0232511 A1 | 8/2018 | Bakish | |
| 2018/0233142 A1 | 8/2018 | Koishida et al. | |
| 2018/0239955 A1 | 8/2018 | Rodriguez et al. | |
| 2018/0240463 A1 | 8/2018 | Perotti | |
| 2018/0254046 A1 | 9/2018 | Khoury et al. | |
| 2018/0289354 A1 | 10/2018 | Cvijanovic et al. | |
| 2018/0292523 A1 | 10/2018 | Orenstein et al. | |
| 2018/0308487 A1 | 10/2018 | Goel et al. | |
| 2018/0336716 A1 | 11/2018 | Ramprashad et al. | |
| 2018/0336901 A1 | 11/2018 | Masaki et al. | |
| 2018/0342237 A1 | 11/2018 | Lee et al. | |
| 2018/0349585 A1 | 12/2018 | Ahn et al. | |
| 2018/0358020 A1 | 12/2018 | Chen et al. | |
| 2018/0366124 A1 | 12/2018 | Cilingir et al. | |
| 2018/0374487 A1 | 12/2018 | Lesso | |
| 2019/0005963 A1 | 1/2019 | Alonso et al. | |
| 2019/0005964 A1 | 1/2019 | Alonso et al. | |
| 2019/0013033 A1 | 1/2019 | Bhimanaik et al. | |
| 2019/0027152 A1 | 1/2019 | Huang et al. | |
| 2019/0030452 A1 | 1/2019 | Fassbender et al. | |
| 2019/0042871 A1 | 2/2019 | Pogorelik | |
| 2019/0065478 A1 | 2/2019 | Tsujikawa et al. | |
| 2019/0098003 A1 | 3/2019 | Ota | |
| 2019/0103115 A1 | 4/2019 | Lesso | |
| 2019/0114496 A1 | 4/2019 | Lesso | |
| 2019/0114497 A1 | 4/2019 | Lesso | |
| 2019/0115030 A1 | 4/2019 | Lesso | |
| 2019/0115032 A1 | 4/2019 | Lesso | |
| 2019/0115033 A1 | 4/2019 | Lesso | |
| 2019/0115046 A1 | 4/2019 | Lesso | |
| 2019/0122670 A1 | 4/2019 | Roberts et al. | |
| 2019/0147888 A1 | 5/2019 | Lesso | |
| 2019/0149932 A1 | 5/2019 | Lesso | |
| 2019/0180014 A1 | 6/2019 | Kovvali et al. | |
| 2019/0197755 A1 | 6/2019 | Vats | |
| 2019/0199935 A1 | 6/2019 | Danielsen et al. | |
| 2019/0228778 A1 | 7/2019 | Lesso | |
| 2019/0228779 A1 | 7/2019 | Lesso | |
| 2019/0246075 A1 | 8/2019 | Khadloya et al. | |
| 2019/0260731 A1 | 8/2019 | Chandrasekharan et al. | |
| 2019/0294629 A1 | 9/2019 | Wexler et al. | |
| 2019/0295554 A1 | 9/2019 | Lesso | |
| 2019/0304470 A1* | 10/2019 | Ghaemmaghami | G10L 17/06 |
| 2019/0306594 A1 | 10/2019 | Aumer et al. | |
| 2019/0311722 A1 | 10/2019 | Caldwell | |
| 2019/0313014 A1 | 10/2019 | Melbourne et al. | |
| 2019/0318035 A1 | 10/2019 | Blanco et al. | |
| 2019/0356588 A1 | 11/2019 | Shahraray et al. | |
| 2019/0371330 A1 | 12/2019 | Lin et al. | |
| 2019/0372969 A1 | 12/2019 | Chang et al. | |
| 2019/0373438 A1 | 12/2019 | Amir et al. | |
| 2019/0392145 A1 | 12/2019 | Komogortsev | |
| 2019/0394195 A1 | 12/2019 | Chari et al. | |
| 2020/0035247 A1 | 1/2020 | Boyadjiev et al. | |
| 2020/0204937 A1 | 6/2020 | Lesso | |
| 2020/0227071 A1 | 7/2020 | Lesso | |
| 2020/0286492 A1 | 9/2020 | Lesso | |

FOREIGN PATENT DOCUMENTS

| | | |
|---|---|---|
| CN | 104252860 A | 12/2014 |
| CN | 104956715 A | 9/2015 |
| CN | 105185380 A | 12/2015 |
| CN | 105702263 A | 6/2016 |
| CN | 105869630 A | 8/2016 |
| CN | 105913855 A | 8/2016 |
| CN | 105933272 A | 9/2016 |
| CN | 105938716 A | 9/2016 |
| CN | 106297772 A | 1/2017 |
| CN | 106531172 A | 3/2017 |
| CN | 107251573 A | 10/2017 |
| EP | 1205884 A2 | 5/2002 |
| EP | 1701587 A2 | 9/2006 |
| EP | 1928213 A1 | 6/2008 |
| EP | 1965331 A2 | 9/2008 |
| EP | 2660813 A1 | 11/2013 |
| EP | 2704052 A2 | 3/2014 |
| EP | 2860706 A2 | 4/2015 |
| EP | 3016314 A1 | 5/2016 |
| EP | 3156978 A1 | 4/2017 |
| EP | 3466106 A1 | 4/2019 |

(56) References Cited

FOREIGN PATENT DOCUMENTS

| | | | |
|---|---|---|---|
| GB | 2375205 A | 11/2002 |
| GB | 2493849 A | 2/2013 |
| GB | 2499781 A | 9/2013 |
| GB | 2515527 A | 12/2014 |
| GB | 2541466 A | 2/2017 |
| GB | 2551209 A | 12/2017 |
| JP | 2003058190 A | 2/2003 |
| JP | 2006010809 A | 1/2006 |
| JP | 2010086328 A | 4/2010 |
| WO | 9834216 A2 | 8/1998 |
| WO | 02/103680 A2 | 12/2002 |
| WO | 2006054205 A1 | 5/2006 |
| WO | 2007034371 A2 | 3/2007 |
| WO | 2008113024 A1 | 9/2008 |
| WO | 2010066269 A1 | 6/2010 |
| WO | 2013022930 A1 | 2/2013 |
| WO | 2013154790 A1 | 10/2013 |
| WO | 2014040124 A1 | 3/2014 |
| WO | 2015117674 A1 | 8/2015 |
| WO | 2015163774 A1 | 10/2015 |
| WO | 2016003299 A1 | 1/2016 |
| WO | 2017055551 A1 | 4/2017 |
| WO | 2017203484 A1 | 11/2017 |

OTHER PUBLICATIONS

Combined Search and Examination Report under Sections 17 and 18(3), UKIPO, Application No. GB1719731.0, dated May 16, 2018.
International Search Report and Written Opinion of the International Searching Authority, International Application No. PCT/GB2019/052302, dated Oct. 2, 2019.
Liu, Yuan et al., "Speaker verification with deep features", Jul. 2014, in International Joint Conference on Neural Networks (IJCNN), pp. 747-753, IEEE.
International Search Report and Written Opinion of the International Searching Authority, International Application No. PCT/GB2018/051927, dated Sep. 25, 2018.
Combined Search and Examination Report under Sections 17 and 18(3), UKIPO, Application No. 1801530.5, dated Jul. 25, 2018.
International Search Report and Written Opinion of the International Searching Authority, International Application No. PCT/GB2018/051924, dated Sep. 26, 2018.
Combined Search and Examination Report under Sections 17 and 18(3), UKIPO, Application No. 1801526.3, dated Jul. 25, 2018.
International Search Report and Written Opinion of the International Searching Authority, International Application No. PCT/GB2018/051931, dated Sep. 27, 2018.
Combined Search and Examination Report under Sections 17 and 18(3), UKIPO, Application No. 1801527.1, dated Jul. 25, 2018.
International Search Report and Written Opinion of the International Searching Authority, International Application No. PCT/GB2018/051925, dated Sep. 26, 2018.
Combined Search and Examination Report under Sections 17 and 18(3), UKIPO, Application No. 1801528.9, dated Jul. 25, 2018.
International Search Report and Written Opinion of the International Searching Authority, International Application No. PCT/GB2018/051928, dated Dec. 3, 2018.
Combined Search and Examination Report under Sections 17 and 18(3), UKIPO, Application No. 1801532.1, dated Jul. 25, 2018.
International Search Report and Written Opinion of the International Searching Authority, International Application No. PCT/GB2018/053274, dated Jan. 24, 2019.
Beigi, Homayoon, "Fundamentals of Speaker Recognition," Chapters 8-10, ISBN: 978-0-378-77592-0; 2011.
Li, Lantian et al., "A Study on Replay Attack and Anti-Spoofing for Automatic Speaker Verification", Interspeech 2017, Jan. 1, 2017, pp. 92-96.
Li, Zhi et al., "Compensation of Hysteresis Nonlinearity in Magnetostrictive Actuators with Inverse Multiplicative Structure for Preisach Model", IEE Transactions on Automation Science and Engineering, vol. 11, No. 2, Apr. 1, 2014, pp. 613-619.
Partial International Search Report of the International Searching Authority, International Application No. PCT/GB2018/052905, dated Jan. 25, 2019.
Combined Search and Examination Report, UKIPO, Application No. GB1713699.5, dated Feb. 21, 2018.
Combined Search and Examination Report, UKIPO, Application No. GB1713695.3, dated Feb. 19, 2018.
Zhang et al., An Investigation of Deep-Learing Frameworks for Speaker Verification Antispoofing—IEEE Journal of Selected Topics in Signal Processes, Jun. 1, 2017.
Combined Search and Examination Report under Sections 17 and 18(3), UKIPO, Application No. GB1809474.8, dated Jul. 23, 2018.
Wu et al., Anti-Spoofing for text-independent Speaker Verification: An Initial Database, Comparison of Countermeasures, and Human Performance, IEEE/ACM Transactions on Audio, Speech, and Language Processing, Issue Date: Apr. 2016.
International Search Report and Written Opinion of the International Searching Authority, International Application No. PCT/GB2018/051760, dated Aug. 3, 2018.
International Search Report and Written Opinion of the International Searching Authority, International Application No. PCT/GB2018/051787, dated Aug. 16, 2018.
International Search Report and Written Opinion of the International Searching Authority, International Application No. PCT/GB2018/052907, dated Jan. 15, 2019.
Ajmera, et al. "Robust Speaker Change Detection," IEEE Signal Processing Letters, vol. 11, No. 8, pp. 649-651, Aug. 2004.
Combined Search and Examination Report under Sections 17 and 18(3), UKIPO, Application No. GB1803570.9, dated Aug. 21, 2018.
International Search Report and Written Opinion of the International Searching Authority, International Application No. PCT/GB2018/051765, dated Aug. 16, 2018.
Combined Search and Examination Report under Sections 17 and 18(3), UKIPO, Application No. GB1801663.4, dated Jul. 18, 2018.
Combined Search and Examination Report under Sections 17 and 18(3), UKIPO, Application No. GB1801659.2, dated Jul. 26, 2018.
Combined Search and Examination Report under Sections 17 and 18(3), UKIPO, Application No. GB1801661.8, dated Jul. 30, 2018.
Combined Search and Examination Report under Sections 17 and 18(3), UKIPO, Application No. GB1801684.2, dated Aug. 1, 2018.
Combined Search and Examination Report, UKIPO, Application No. GB1801874.7, dated Jul. 25, 2018.
Combined Search and Examination Report under Sections 17 and 18(3), UKIPO, Application No. GB1804843.9, dated Sep. 27, 2018.
International Search Report and Written Opinion of the International Searching Authority, International Application No. PCT/GB2018/052906, dated Jan. 14, 2019.
Villalba, Jesus et al., Preventing Replay Attacks on Speaker Verification Systems, International Carnahan Conference On Security Technology (ICCST), 2011 IEEE, Oct. 18, 2011, pp. 1-8.
Combined Search and Examination Report, UKIPO, Application No. GB1713697.9, dated Feb. 20, 2018.
Chen et al., "You Can Hear But You Cannot Steal: Defending Against Voice Impersonation Attacks on Smartphones", Proceedings of the International Conference on Distributed Computing Systems, PD: 20170605.
Further Search Report under Sections 17 (6), UKIPO, Application No. GB1719731.0, dated Nov. 26, 2018.
Ohtsuka, Takahiro and Kasuya, Hideki, Robust ARX Speech Analysis Method Taking Voice Source Pulse Train Into Account, Journal of the Acoustical Society of Japan, 58, 7, pp. 386-397, 2002.
Wikipedia, Voice (phonetics), https://en.wikipedia.org/wiki/Voice_(phonetics), accessed Jun. 1, 2020.
Zhang et al., DolphinAttack: Inaudible Voice Commands, Retrieved from Proceedings of the 2017 ACM SIGSAC Conference on Computer and Communications Security, Aug. 2017.
Song, Liwei, and Prateek Mittal, Poster: Inaudible Voice Commands, Proceedings of the 2017 ACM SIGSAC Conference on Computer and Communications Security, Aug. 2017.

(56) References Cited

OTHER PUBLICATIONS

Fortuna, Andrea, [Online], DolphinAttack: inaudiable voice commands allow attackers to control Siri, Alexa and other digital assistants, Sep. 2017.
Lucas, Jim, What is Electromagnetic Radiation?, Mar. 13, 2015, Live Science, https://www.livescience.com/38169-electromagnetism.html, pp. 1-11 (Year: 2015).
Brownlee, Jason, A Gentle Introduction to Autocorrelation and Partial Autocorrelation, Feb. 6, 2017, https://machinelearningmastery.com/gentle-introduction-autocorrelation-partial-autocorrelation/, accessed Apr. 28, 2020.
First Office Action, China National Intellectual Property Administration, Patent Application No. 2018800418983, dated May 29, 2020.
International Search Report and Written Opinion, International Application No. PCT/GB2020/050723, dated Jun. 16, 2020.
Liu, Yuxi et al., "Earprint: Transient Evoked Otoacoustic Emission for Biometrics", IEEE Transactions on Information Forensics and Security, IEEE, Piscataway, NJ, US, vol. 9, No. 12, Dec. 1, 2014, pp. 2291-2301.
Seha, Sherif Nagib Abbas et al., "Human recognition using transient auditory evoked potentials: a preliminary study", IET Biometrics, IEEE, Michael Faraday House, Six Hills Way, Stevenage, HERTS., UK, vol. 7, No. 3, May 1, 2018, pp. 242-250.
Liu, Yuxi et al., "Biometric identification based on Transient Evoked Otoacoustic Emission", IEEE International Symposium on Signal Processing and Information Technology, IEEE, Dec. 12, 2013, pp. 267-271.
Boesen, U.S. Appl. No. 62/403,045, filed Sep. 30, 2017.
Meng, Y. et al., "Liveness Detection for Voice User Interface via Wireless Signals in IoT Environment," in IEEE Transactions on Dependable and Secure Computing, doi: 10.1109/TDSC.2020.2973620.
Zhang, L. et al., Hearing Your Voice is Not Enough: An Articulatory Gesture Based Liveness Detection for Voice Authentication, CCS '17: Proceedings of the 2017 ACM SIGSAC Conference on Computer and Communications Security, Oct. 2017 pp. 57-71.
Toth, Arthur R., et al., Synthesizing Speech from Doppler Signals, ICASSP 2010, IEEE, pp. 4638-4641.
First Office Action, China National Intellectual Property Administration, Application No. 2018800720846, dated Mar. 1, 2021.
Wu, Libing, et al., LVID: A Multimodal Biometricas Authentication System on Smartphones, IEEE Transactions on Information Forensics and Security, Vo. 15, 2020, pp. 1572-1585.
Wang, Qian, et al., VoicePop: A Pop Noise based Anti-spoofing System for Voice Authentication on Smartphones, IEEE INFOCOM 2019—IEEE Conference on Computer Communications, Apr. 29-May 2, 2019, pp. 2062-2070.
Combined Search and Examination Report under Sections 17 and 18(3), UKIPO, Application No. GB2105613.0, dated Sep. 27, 2021.
Examination Report under Section 18(3), UKIPO, Application No. GB1918956.2, dated Jul. 29, 2021.
Examination Report under Section 18(3), UKIPO, Application No. GB1918965.3, dated Aug. 2, 2021.
Combined Search and Examination Report under Sections 17 and 18(3), UKIPO, Application No. GB2114337.5, dated Nov. 3, 2021.

\* cited by examiner

ANALYSING SPEECH SIGNALS

TECHNICAL FIELD

Embodiments described herein relate to methods and devices for analysing speech signals.

BACKGROUND

Many devices include microphones, which can be used to detect ambient sounds. In many situations, the ambient sounds include the speech of one or more nearby speaker. Audio signals generated by the microphones can be used in many ways. For example, audio signals representing speech can be used as the input to a speech recognition system, allowing a user to control a device or system using spoken commands.

SUMMARY

According to an aspect of the present invention, there is provided a method of analysis of an audio signal, the method comprising: receiving an audio signal representing speech; extracting first and second components of the audio signal representing first and second acoustic classes of the speech respectively; analysing the first and second components of the audio signal with models of the first and second acoustic classes of the speech of an enrolled user; and based on said analysing, obtaining information about at least one of a channel and noise affecting said audio signal.

According to another aspect of the present invention, there is provided a system for analysing an audio signal, configured for performing the method.

According to another aspect of the present invention, there is provided a device comprising such a system. The device may comprise a mobile telephone, an audio player, a video player, a mobile computing platform, a games device, a remote controller device, a toy, a machine, or a home automation controller or a domestic appliance.

According to another aspect of the present invention, there is provided a computer program product, comprising a computer-readable tangible medium, and instructions for performing a method according to the first aspect.

According to another aspect of the present invention, there is provided a non-transitory computer readable storage medium having computer-executable instructions stored thereon that, when executed by processor circuitry, cause the processor circuitry to perform a method according to the first aspect.

According to a further aspect of the invention, there is provided a method of determining whether a received signal may result from a replay attack, the method comprising:
receiving an audio signal representing speech;
obtaining information about a channel affecting said audio signal; and
determining whether the channel has at least one characteristic of a loudspeaker.

The step of determining whether the channel has at least one characteristic of a loudspeaker may comprise:
determining whether the channel has a low frequency roll-off.

The step of determining whether the channel has a low frequency roll-off may comprise determining whether the channel decreases at a constant rate for frequencies below a lower cut-off frequency.

The step of determining whether the channel has at least one characteristic of a loudspeaker may comprise:
determining whether the channel has a high frequency roll-off.

The step of determining whether the channel has a high frequency roll-off may comprise determining whether the channel decreases at a constant rate for frequencies above an upper cut-off frequency.

The step of determining whether the channel has at least one characteristic of a loudspeaker may comprise:
determining whether the channel has ripple in a pass-band thereof.

The step of determining whether the channel has ripple in a pass-band thereof may comprise determining whether a degree of ripple over a central part of the pass-band, for example from 100 Hz-10 kHz, exceeds a threshold amount.

According to a further aspect of the invention, there is provided a system for determining whether a received signal may result from a replay attack, the system comprising an input for receiving an audio signal, and being configured for:
receiving an audio signal representing speech;
obtaining information about a channel affecting said audio signal; and
determining whether the channel has at least one characteristic of a loudspeaker.

According to a further aspect of the invention, there is provided a device comprising such a system. The device may comprise a mobile telephone, an audio player, a video player, a mobile computing platform, a games device, a remote controller device, a toy, a machine, or a home automation controller or a domestic appliance.

According to a further aspect of the invention, there is provided a computer program product, comprising a computer-readable tangible medium, and instructions for performing a method according to a previous aspect.

According to a further aspect of the invention, there is provided a non-transitory computer readable storage medium having computer-executable instructions stored thereon that, when executed by processor circuitry, cause the processor circuitry to perform a method according to a previous aspect.

BRIEF DESCRIPTION OF DRAWINGS

For a better understanding of the present invention, and to show how it may be put into effect, reference will now be made to the accompanying drawings, in which:—

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The methods described herein can be implemented in a wide range of devices and systems. However, for ease of explanation of one embodiment, an illustrative example will be described, in which the implementation occurs in a smartphone.

Figure 1:
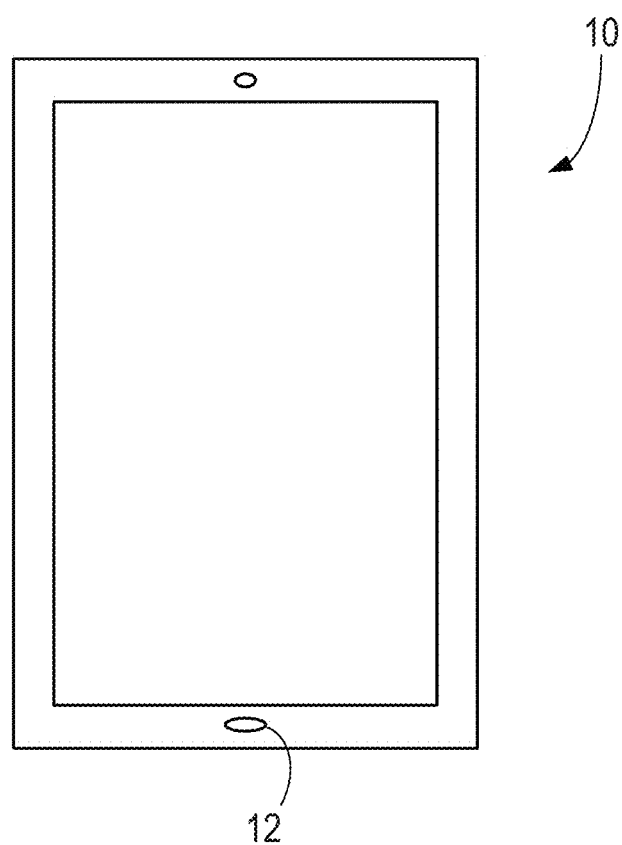
FIG. 1 illustrates a smartphone.

FIG. 1 illustrates a smartphone 10, having a microphone 12 for detecting ambient sounds. In normal use, the microphone is of course used for detecting the speech of a user who is holding the smartphone 10 close to their face.

Figure 2:
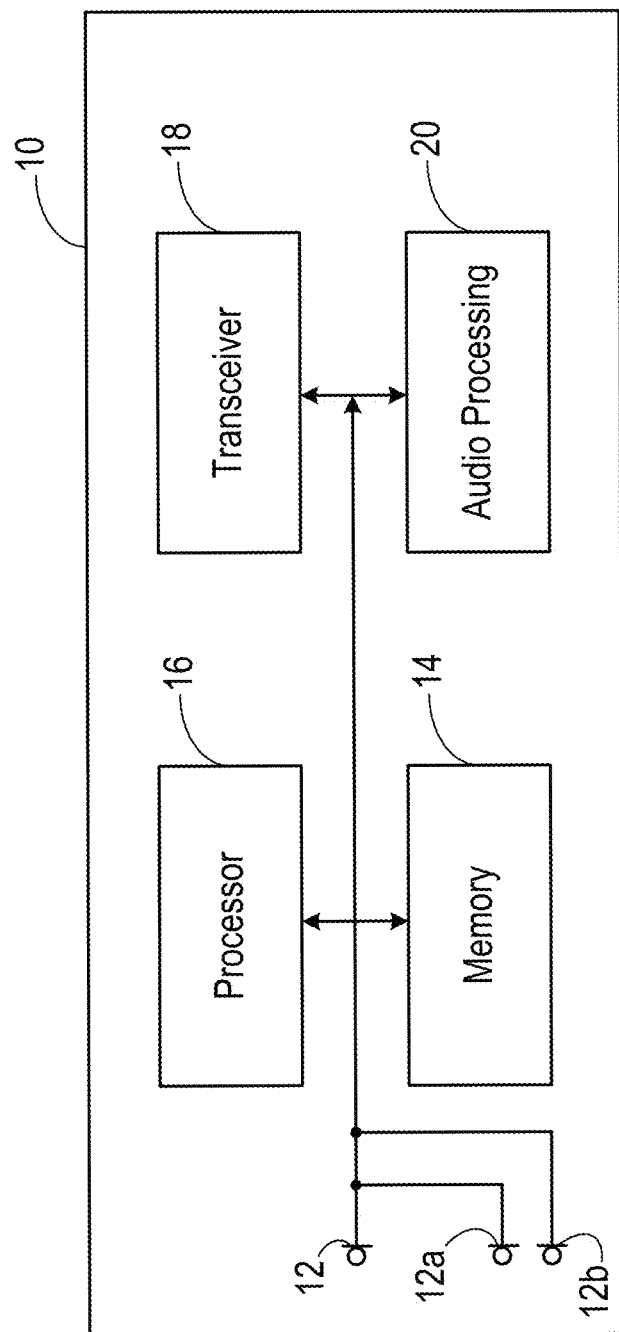
FIG. 2 is a schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12a, 12b, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

In this embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device.

Methods described herein proceed from the recognition that different parts of a user's speech have different properties.

Specifically, it is known that speech can be divided into voiced sounds and unvoiced or voiceless sounds. A voiced sound is one in which the vocal cords of the speaker vibrate, and a voiceless sound is one in which they do not.

It is now recognised that the voiced and unvoiced sounds have different frequency properties, and that these different frequency properties can be used to obtain useful information about the speech signal.

Figure 3:
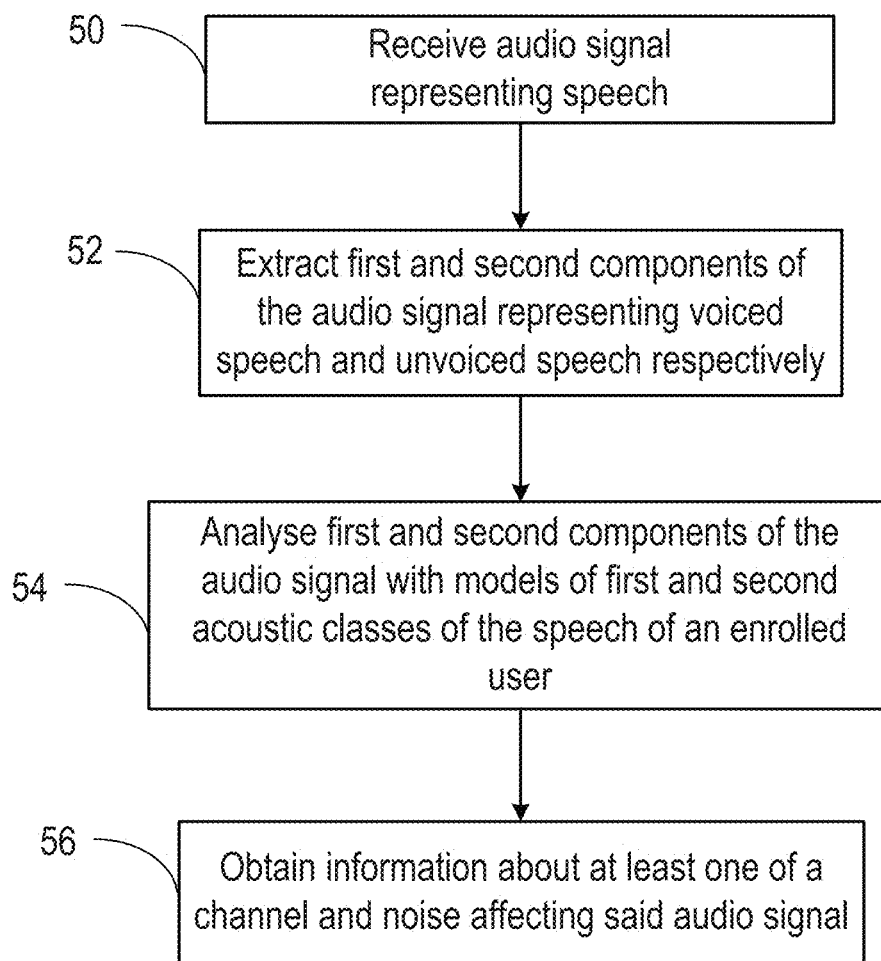
FIG. 3 is a flow chart illustrating a method of analysing an audio signal.
Figure 4:
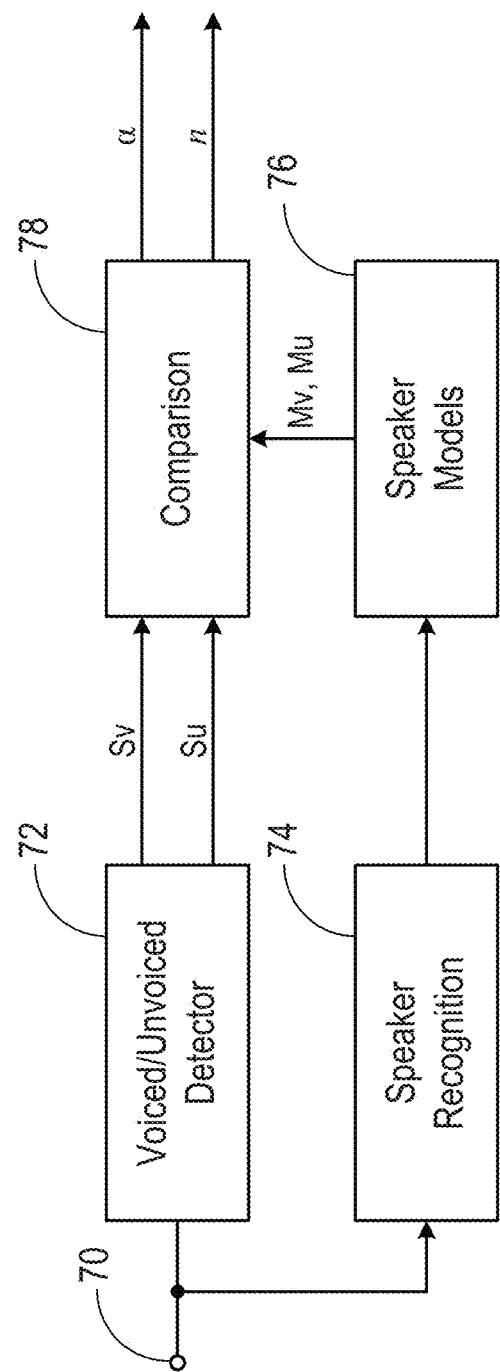
FIG. 4 is a block diagram illustrating a system for analysing an audio signal.

FIG. 3 is a flow chart, illustrating a method of analysing an audio signal, and FIG. 4 is a block diagram illustrating functional blocks in the analysis system.

Specifically, in step 50 in the method of FIG. 3, an audio signal, which is expected to contain speech, is received on an input 70 of the system shown in FIG. 4.

The received signal is divided into frames, which may for example have lengths in the range of 10-100 ms, and then passed to a voiced/unvoiced detection block 72. Thus, in step 52 of the process, first and second components of the audio signal, representing different first and second acoustic classes of the speech, are extracted from the received signal. Extracting the first and second components of the audio signal may comprise identifying periods when the audio signal contains the first acoustic class of speech, and identifying periods when the audio signal contains the second acoustic class of speech. More specifically, extracting the first and second components of the audio signal may comprise identifying frames of the audio signal that contain the first acoustic class of speech, and frames that contain the second acoustic class of speech.

When the first and second acoustic classes of the speech are voiced speech and unvoiced speech, there are several methods that can be used to identify voiced and unvoiced speech, for example: using a deep neural network (DNN), trained against a golden reference, for example using Praat software; performing an autocorrelation with unit delay on the speech signal (because voiced speech has a higher autocorrelation for non-zero lags); performing a linear predictive coding (LPC) analysis (because the initial reflection coefficient is a good indicator of voiced speech); looking at the zero-crossing rate of the speech signal (because unvoiced speech has a higher zero-crossing rate); looking at the short term energy of the signal (which tends to be higher for voiced speech); tracking the first formant frequency F0 (because unvoiced speech does not contain the first format frequency); examining the error in a linear predictive coding (LPC) analysis (because the LPC prediction error is lower for voiced speech); using automatic speech recognition to identify the words being spoken and hence the division of the speech into voiced and unvoiced speech; or fusing any or all of the above.

In the embodiments described further below, the first and second acoustic classes of the speech are voiced speech and unvoiced speech. However, the first and second acoustic classes of the speech may be any phonetically distinguishable acoustic classes. For example, they may be different phoneme classes, for example two different sets of vowels; they may be two different fricatives; or the first class may be fricatives while the second class are sibilants.

The received signal may be supplied to a voice activity detection block, and only supplied to the voiced/unvoiced detection block 72 when it is determined that it does contain speech. In that case, or otherwise when there is reason to believe that the audio signal contains only speech, the step of identifying periods when the audio signal contains unvoiced speech may comprise identifying periods when the audio signal contains voiced speech, and identifying the remaining periods of speech as containing unvoiced speech.

The voiced/unvoiced detection block 72 may for example be based on Praat speech analysis software.

The voiced/unvoiced detection block 72 thus outputs the first component of the audio signal, Sv, representing voiced speech and the second component, Su, representing unvoiced speech.

More specifically, in some embodiments, the first component of the audio signal, Sv, representing voiced speech and the second component, Su, representing unvoiced speech, are averaged spectra of the voiced and unvoiced components of the speech. By averaged spectra are meant spectra of the speech obtained and averaged over multiple frames.

The spectra can be averaged over enough data to provide reasonable confidence in the information that is obtained about the speech signal. In general terms, this information will become more reliable as more data is used to form the average spectra.

In some cases, spectra averaged over 500 ms of the relevant speech will be enough to provide reliable averaged spectra. The length of time over which the averaged spectra are generated may be adapted based on the articulation rate of the speech, in order to ensure that the speech contains enough phonetic variation to provide a reliable average. The length of time over which the averaged spectra are generated may be adapted based on the content of the speech. If the user is speaking a predetermined known phrase, this may be more discriminative than speaking words of the user's choosing, and so a useful average can be obtained in a shorter period. The process illustrated in FIG. 3 may be performed regularly while the user is speaking, providing regularly updated information at the end of the method as more speech is received. It may then be judged that enough speech has been processed when the results of the method converge to stable values.

The signal received on the input 70 is also passed to a speaker recognition block 74, which performs a voice biometric process to identify the speaker, from amongst a plurality of enrolled speakers. The process of enrollment in a speaker recognition system typically involves the speaker providing a sample of speech, from which specific features are extracted, and the extracted features are used to form a model of the speaker's speech. In use, corresponding features are extracted from a sample of speech, and these are compared with the previously obtained model to obtain a measure of the likelihood that the speaker is the previously enrolled speaker.

In some situations, the speaker recognition system attempts to identify one or more enrolled speaker without any prior expectation as to who the speaker should be. In other situations, there is a prior expectation as to who the speaker should be, for example because there is only one enrolled user of the particular device that is being used, or because the user has already identified themselves in some other way.

In this illustrated example, the speaker recognition block 74 is used to identify the speaker. In other examples, there may be an assumption that the speaker is a particular person, or is selected from a small group of people.

In step 54 of the process shown in FIG. 3, the first and second components of the audio signal are compared with models of the first acoustic class (for example the voiced component) of the speech of an enrolled user and of the second acoustic class (for example the unvoiced component) of the speech of the enrolled user. For example, comparing the first and second components of the audio signal with the models of the voiced and unvoiced speech of the enrolled user may comprise comparing magnitudes of the audio signal at a number of predetermined frequencies with magnitudes in the models.

Thus, in the system shown in FIG. 4, one or more speaker model is stored, for example in a database. Based on the output of the speaker recognition block 74, or based on a prior assumption as to who the speaker is expected to be, one or more speaker model is selected.

In this embodiment, each speaker model contains separate models of the voiced speech and the unvoiced speech of the enrolled user. More specifically, the model of the voiced speech and the model of the unvoiced speech of the enrolled user each comprise amplitude values corresponding to multiple frequencies.

Figure 5:
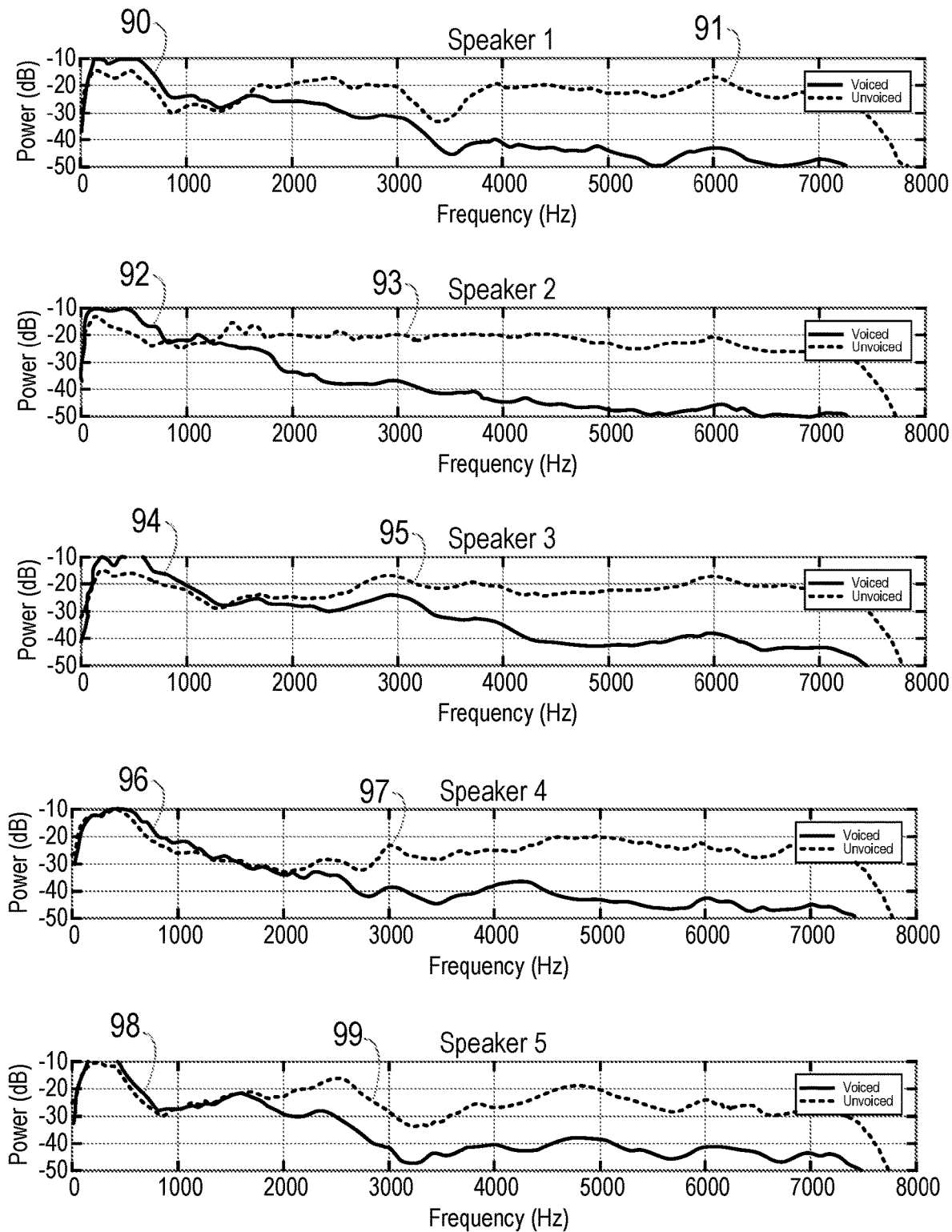
FIG. 5 illustrates results in the method of FIG. 3.

Thus, FIG. 5 shows a multiple speaker models.

Specifically, each speaker model shown in FIG. 5 comprises a long term averaged spectrum of the voiced components of the speech and a long term averaged spectrum of the unvoiced components of the speech. These models are obtained from the respective speakers during previous separate enrollment processes, during which the speakers speak, either uttering predetermined standard test phrases or saying words of their own choosing.

FIG. 5 shows the speaker models for five speakers, labelled Speaker 1-Speaker 5. The model for Speaker 1 comprises the long term averaged spectrum 90 of the voiced components of the speech and the long term averaged spectrum 91 of the unvoiced components of the speech; the model for Speaker 2 comprises the long term averaged spectrum 92 of the voiced components of the speech and the long term averaged spectrum 93 of the unvoiced components of the speech; the model for Speaker 3 comprises the long term averaged spectrum 94 of the voiced components of the speech and the long term averaged spectrum 95 of the unvoiced components of the speech; the model for Speaker 4 comprises the long term averaged spectrum 96 of the voiced components of the speech and the long term averaged spectrum 97 of the unvoiced components of the speech; and the model for Speaker 5 comprises the long term averaged spectrum 98 of the voiced components of the speech and the long term averaged spectrum 99 of the unvoiced components of the speech.

In each case, the model of the speech comprises a vector containing amplitude values at a plurality of frequencies.

The plurality of frequencies may be selected from within a frequency range that contains the most useful information for discriminating between speakers. For example, the range may be from 20 Hz to 8 kHz, or from 20 Hz to 4 kHz.

The frequencies at which the amplitude values are taken may be linearly spaced, with equal frequency spacings between each adjacent pair of frequencies. Alternatively, the frequencies may be non-linearly spaced. For example, the frequencies may be equally spaced on the mel scale.

The number of amplitude values used to form the model of the speech may be chosen depending on the frequency spacings. For example, using linear spacings the model may contain amplitude values for 64 to 512 frequencies. Using mel spacings, it may be possible to use fewer frequencies, for example between 10 and 20 mel-spaced frequencies.

Thus, the model of the voiced speech may be indicated as Mv, where Mv represents a vector comprising one amplitude value at each of the selected frequencies, while the model of the unvoiced speech may be indicated as Mu, where Mu represents a vector comprising one amplitude value at each of the selected frequencies.

As will be appreciated, the received signal, containing the user's speech, will be affected by the properties of the channel, which we take to mean any factor that produces a difference between the user's speech and the speech signal as generated by the microphone alters, and the received signal will also be affected by noise.

Thus, assuming that the channel and the noise are constant over the period during which the received signal is averaged to form the first and second components of the received speech, these first and second components can be expressed as:

$$Sv = \alpha.Mv + n, \text{ and}$$

$$Su = \alpha.Mu + n,$$

where

α represents the frequency spectrum of a multiplicative disturbance component, referred to herein as the channel, and n represents the frequency spectrum of an additive disturbance component, referred to herein as the noise.

Thus, with measurements Sv and Su, and with models Mv and Mu, these two equations can therefore be solved for the two unknowns, α and n.

Thus, for illustrative purposes, $$\alpha = \frac{(Su - Sv)}{(Mu - Mv)},$$

and $$n = \frac{(SuMv - SvMu)}{(Mu - Mv)}.$$

For completeness, it should be noted that, with measurements of the spectrum made at a plurality of frequencies, these two equations are effectively solved at each of the frequencies.

Alternatively, with measurements made at f different frequencies, the equations $Sv = \alpha.Mv + n$, and $Su = \alpha.Mu + n$ can each be regarded as f different equations to be solved.

In that case, having solved the equations, it may be useful to apply a low-pass filter, or a statistical filter such as a Savitzky-Golay filter, to the results in order to obtain low-pass filtered versions of the channel and noise characteristics.

As an alternative example, a least squares method may be used to obtain solutions to the 2f different equations.

It will be noted that the calculations set out above rely on determining the difference (Mu−Mv) between the model of the unvoiced speech and the model of the voiced speech. Where these are similar, for example in the range 1.3-1.6 kHz in the case of Speaker 1 in FIG. 5, then any small uncertainties in either of the models will potentially be magnified into large errors in the calculated values for the channel and/or the noise. Thus, the calculated values in any such frequency ranges may be given lower significance in any subsequent processing steps that use the calculated values, for example a reduced can weight applied to the values used in later processing steps. Alternatively, when it is known in advance that the model of the unvoiced speech and the model of the voiced speech are similar in a particular frequency range, the equations given above need not be solved for frequencies in this range.

Thus, as shown at step 56 of the process shown in FIG. 3, information is obtained about the channel and/or the noise affecting the audio signal.

This information can be used in many different ways.

Figure 6:
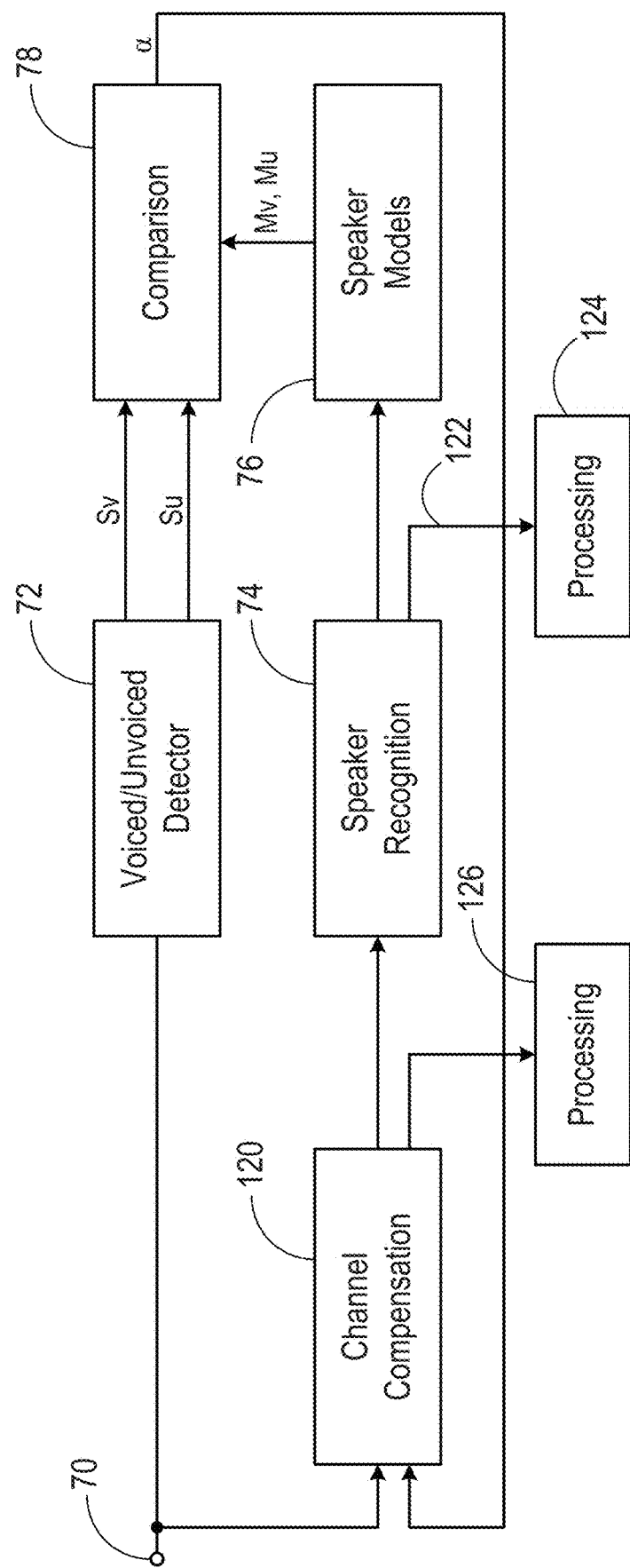
FIG. 6 is a block diagram illustrating an alternative system for analysing an audio signal.

FIG. 6 illustrates one such use. The system shown in FIG. 6 is similar to the system of FIG. 4, and the same reference numerals are used to refer to the same components of the system.

In the system of FIG. 6, the comparison block 78 is used to obtain information about the channel α that is affecting the received audio signal. Specifically, the comparison block 78 may be used to obtain the frequency spectrum of the channel. This can be used to compensate the received audio signal to take account of the channel.

For one example, FIG. 6 shows a channel compensation block 120, to which the audio signal received on the input 70 is supplied. The channel compensation block 120 also receives the frequency spectrum of the channel α. The channel compensation block 120 acts to remove the effects of the channel from the received signal, by dividing the received signal by the calculated channel α, before the received signal is passed to the speaker recognition block 74.

Thus, the output of the speaker recognition block 74, on the output 122, can be improved. That is, it can provide more reliable information about the identity of the speaker. This can then be supplied to a processing block 124 and used for any required purposes.

The output of the channel compensation block 120, containing the received signal after the effects of the channel have been removed, can be supplied to any suitable processing block 126, such as a speech recognition system, or the like.

Figure 7:
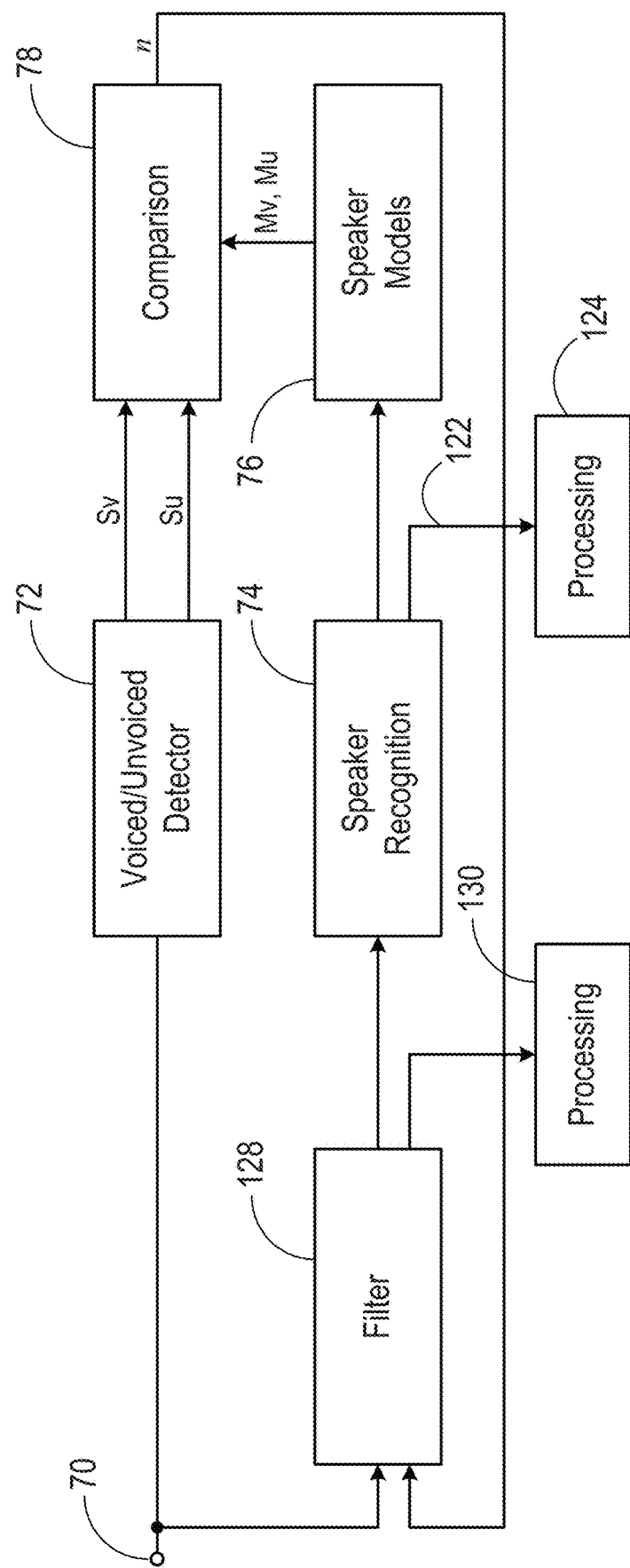
FIG. 7 is a block diagram illustrating a further alternative system for analysing an audio signal.

FIG. 7 illustrates another such use. The system shown in FIG. 7 is similar to the system of FIG. 4, and the same reference numerals are used to refer to the same components of the system.

In the system of FIG. 7, the comparison block 78 is used to obtain information about the noise n that is affecting the received audio signal. Specifically, the comparison block 78 may be used to obtain the frequency spectrum of the noise. This can be used to take account of the noise when processing the received audio signal.

For one example, FIG. 7 shows a filter block 128, to which the audio signal received on the input 70 is supplied. The filter block 128 also receives the frequency spectrum of the noise n. The filter block 128 acts so as to ensure that noise does not adversely affect the operation of the speaker recognition block 74.

For example, the calculated noise characteristic, n, can be subtracted from the received signal before any further processing takes place.

In another example, where the level of noise exceeds a predetermined threshold level at one or more frequencies, such that the operation of the speaker recognition block 74 could be compromised, the filter block 128 can remove the corrupted components of the received audio signal at those frequencies, before passing the signal to the speaker recognition block 74. Alternatively, these components could instead be flagged as being potentially corrupted, before being passed to the speaker recognition block 74 or any further signal processing block.

Thus, the output of the speaker recognition block 74, on the output 122, can be improved. That is, it can provide more reliable information about the identity of the speaker. This can then be supplied to any suitable processing block 124, and used for any required purposes.

The output of the filter block 128, containing the received signal after the frequency components that are excessively corrupted by noise have been removed, can be supplied to any suitable processing block 130, such as a speech recognition system, or the like.

Figure 8:
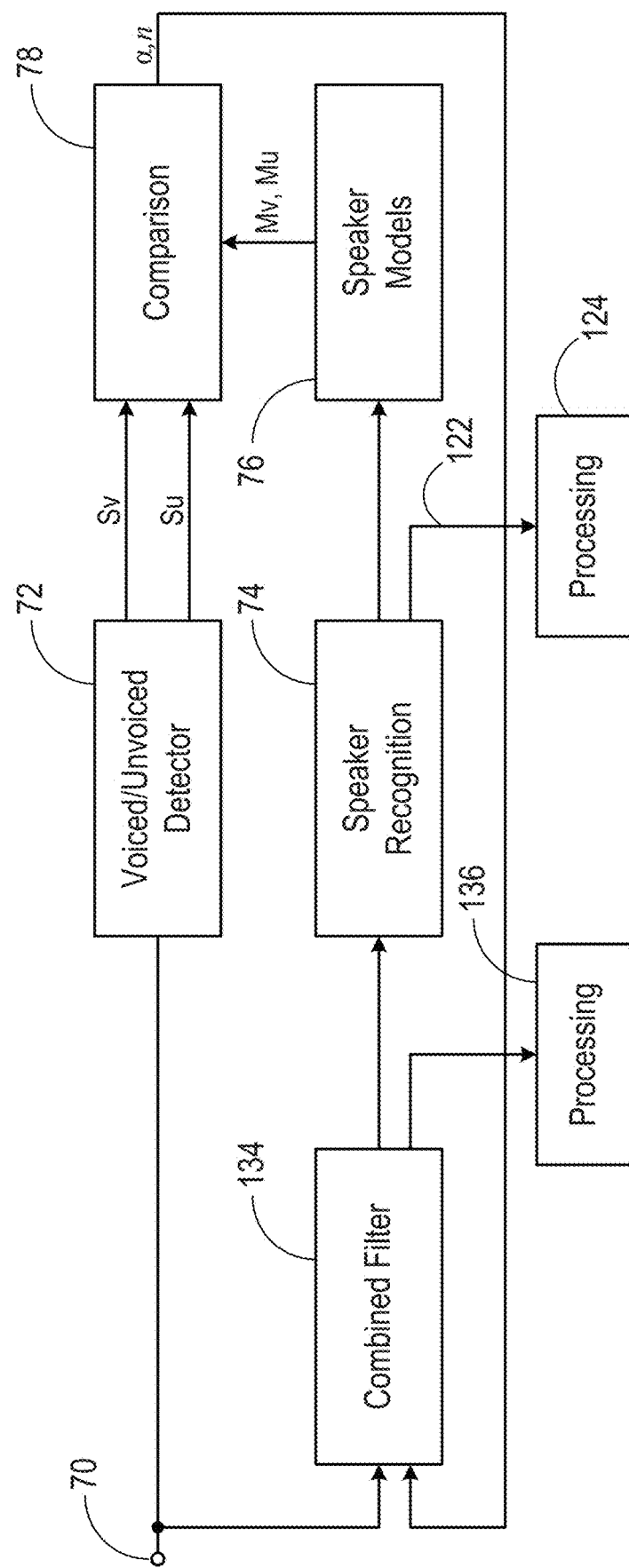
FIG. 8 is a block diagram illustrating a further alternative system for analysing an audio signal.

FIG. 8 illustrates another such use. The system shown in FIG. 8 is similar to the system of FIG. 4, and the same reference numerals are used to refer to the same components of the system.

In the system of FIG. 8, the comparison block 78 is used to obtain information about the channel α and the noise n that are affecting the received audio signal. Specifically, the comparison block 78 may be used to obtain the frequency spectrum of the channel and of the noise. This can be used to take account of the channel and the noise when processing the received audio signal.

For one example, FIG. 8 shows a combined filter block 134, to which the audio signal received on the input 70 is supplied. The combined filter block 134 also receives the frequency spectrum of the channel α and the noise n. The combined filter block 134 acts so as to ensure that channel effects and noise do not adversely affect the operation of the speaker recognition block 74.

For example, the calculated noise characteristic, n, can be subtracted from the received signal, and the remaining signal can be divided by the calculated channel α, before any further processing takes place.

Thus, the output of the speaker recognition block 74, on the output 122, can be improved. That is, it can provide more reliable information about the identity of the speaker. This can then be supplied to any suitable processing block 124, and used for any required purposes.

The output of the combined filter block 134, containing the received signal after the effects of the channel and the noise have been removed, can be supplied to any suitable processing block 136, such as a speech recognition system, or the like.

A further use of the information obtained about the channel and/or the noise affecting the audio signal is to overcome an attempt to deceive a voice biometric system by playing a recording of an enrolled user's voice in a so-called replay or spoof attack.

Figure 9:
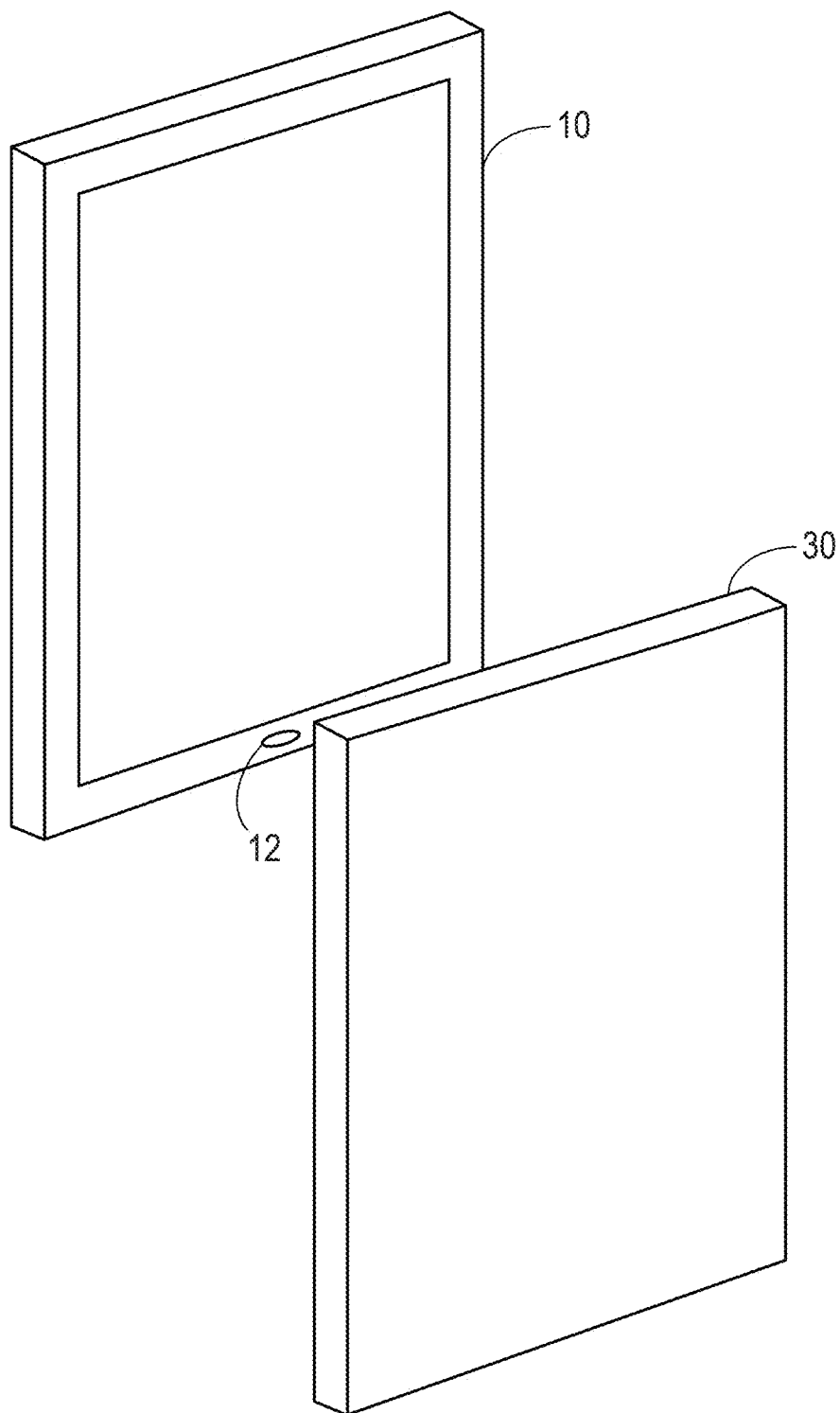
FIG. 9 illustrates a possible relay attack on a voice biometric system.

FIG. 9 shows an example of a situation in which a replay attack is being performed. Thus, in FIG. 9, the smartphone 10 is provided with voice biometric functionality. In this example, the smartphone 10 is in the possession, at least temporarily, of an attacker, who has another smartphone 30. The smartphone 30 has been used to record the voice of the enrolled user of the smartphone 10. The smartphone 30 is brought close to the microphone inlet 12 of the smartphone 10, and the recording of the enrolled user's voice is played back. If the voice biometric system is unable to determine that the enrolled user's voice that it recognises is a recording, the attacker will gain access to one or more services that are intended to be accessible only by the enrolled user.

It is known that smartphones, such as the smartphone 30, are typically provided with loudspeakers that are of relatively low quality. Thus, the recording of an enrolled user's voice played back through such a loudspeaker will not be a perfect match with the user's voice, and this fact can be used to identify replay attacks.

Figure 10:
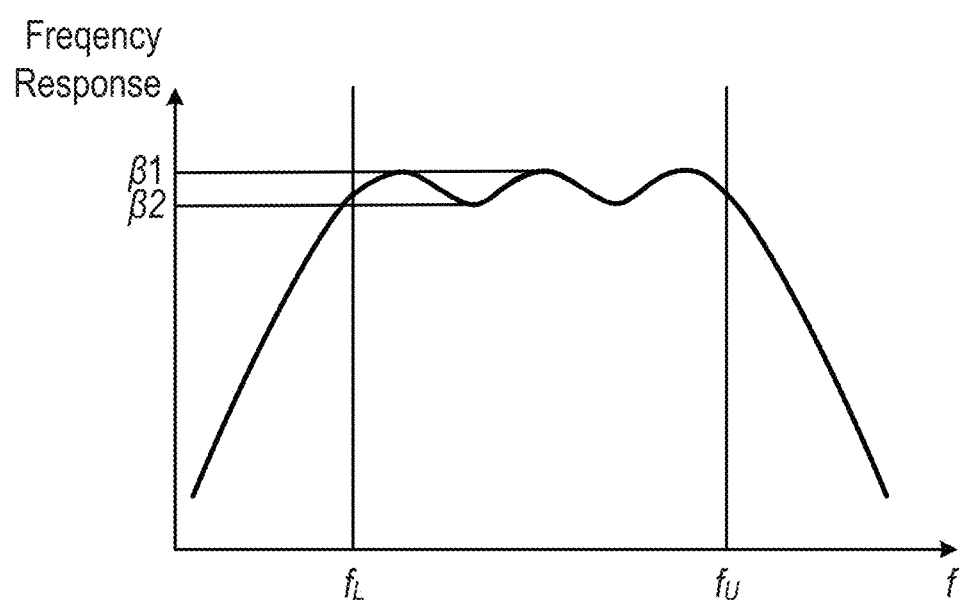
FIG. 10 illustrates an effect of a replay attack.

FIG. 10 illustrates the frequency response of a typical loudspeaker. Thus, at frequencies below a lower threshold frequency $f_L$, the loudspeaker suffers from low-frequency roll-off, as the bass response is limited by the size of the loudspeaker diaphragm. At frequencies above an upper threshold frequency $f_U$, the loudspeaker suffers from high-frequency roll-off. At frequencies between the lower threshold frequency $f_L$ and the upper threshold frequency $f_U$, there is a degree of pass-band ripple, as the magnitude of the response varies periodically between $\beta_1$ and $\beta_2$.

The size of these effects will be determined by the quality of the loudspeaker. For example, in a high quality loudspeaker, the lower threshold frequency $f_L$ and the upper threshold frequency $f_U$ should be such that there is minimal low-frequency roll-off or high-frequency roll-off within the frequency range that is typically audible to humans. However, size and cost constraints mean that many commercially available loudspeakers, such as those provided in smartphones such as the smartphone 30, do suffer from these effects to some extent.

Similarly, the magnitude of the pass-band ripple, that is the difference between $\beta_1$ and $\beta_2$, will also depend on the quality of the loudspeaker.

If the voice of a speaker is played back through a loudspeaker whose frequency response has the general form shown in FIG. 10, then this may be detectable in the received audio signal containing the speech of that speaker. It has previously been recognised that, if a received audio signal has particular frequency characteristics, that may be a sign that the received audio signal is the result of a replay attack. However, the frequency characteristics of the received signal depend on other factors, such as the frequency characteristics of the speech itself, and the properties of any ambient noise, and so it is difficult to make a precise determination that a signal comes from a replay attack based only on the frequency characteristics of the received signal.

However, the method shown in FIG. 3, and described with reference thereto, can be used to make a more reliable determination as to whether a signal comes from a replay attack.

In one possibility, as shown in FIG. 7, the frequency characteristic of the ambient noise is determined, and this is subtracted from the received audio signal by means of the filter 128. The received signal, with noise removed, is supplied to a processing block 130, which in this case may be a replay attack detection block.

For example, the replay attack detection block may perform any of the methods disclosed in EP-2860706A, such as testing whether a particular spectral ratio (for example a ratio of the signal energy from 0-2 kHz to the signal energy from 2-4 kHz) has a value that may be indicative of replay through a loudspeaker, or whether the ratio of the energy within a certain frequency band to the energy of the complete frequency spectrum has a value that may be indicative of replay through a loudspeaker.

In another possibility, the method shown in FIG. 3 is used to determine the frequency characteristic of the channel that affects the received speech. If the speech has been played back through a loudspeaker, the frequency response of the loudspeaker should be visible in the frequency characteristic of the channel.

Figure 11:
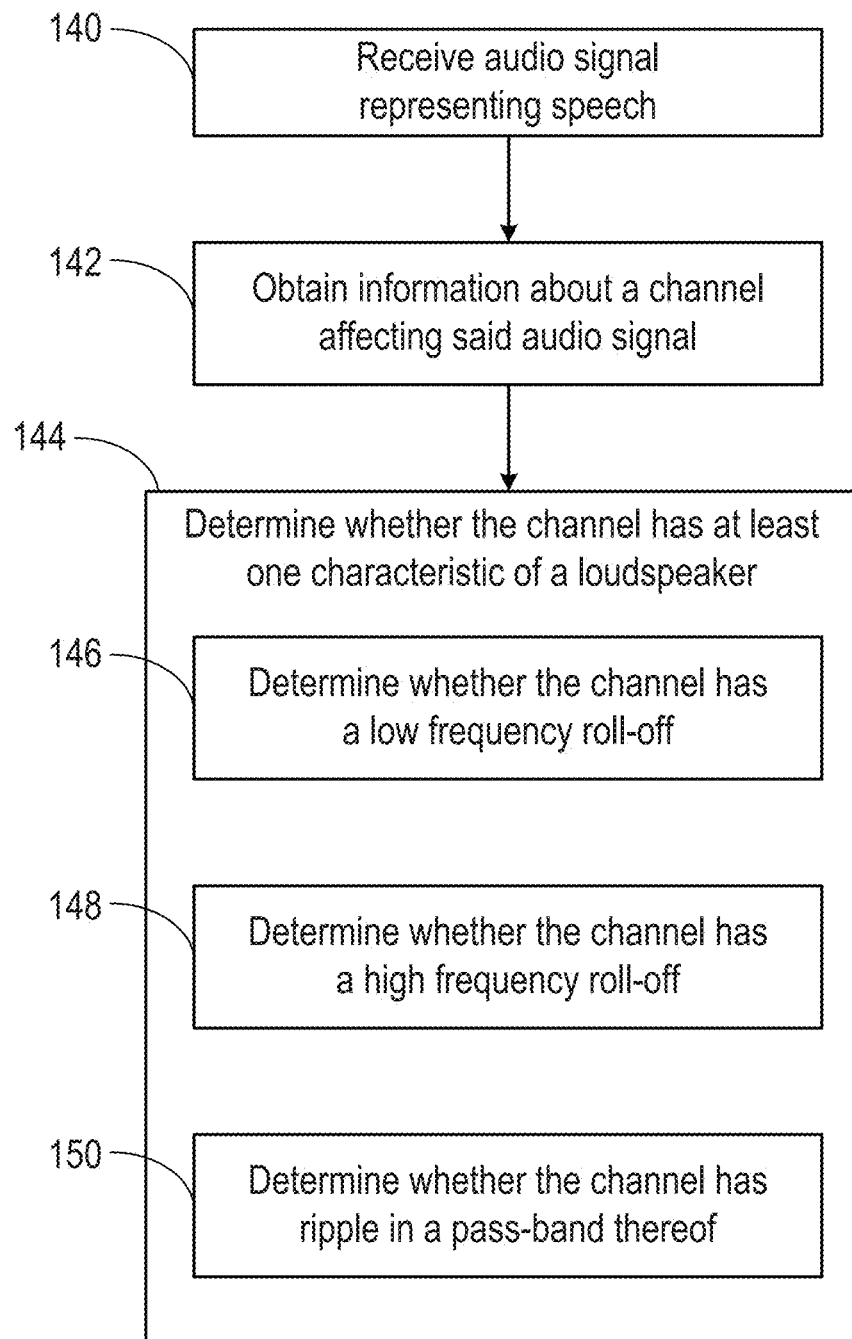
FIG. 11 is a flow chart illustrating a method of detecting a replay attack.

FIG. 11 is a flow chart, illustrating a method of determining whether the received signal may result from a replay attack.

In the method of FIG. 11, in step 140, an audio signal is received, representing speech.

In step 142, information is obtained about a channel affecting said audio signal. For example, the information about the channel may be obtained by the method shown in FIG. 3.

In step 144, it is determined whether the channel has at least one characteristic of a loudspeaker.

As shown at step 146, determining whether the channel has at least one characteristic of a loudspeaker may comprise determining whether the channel has a low frequency roll-off. For example, the low-frequency roll-off may involve the measured channel decreasing at a relatively constant rate, such as 6 dB per octave, for frequencies below a lower cut-off frequency $f_L$, which may for example be in the range 50 Hz-700 Hz.

As shown at step 148, determining whether the channel has at least one characteristic of a loudspeaker may comprise determining whether the channel has a high frequency roll-off. For example, the high-frequency roll-off may involve the measured channel decreasing at a relatively constant rate, such as 6 dB per octave, for frequencies above an upper cut-off frequency $f_U$, which may for example be in the range 18 kHz-24 kHz.

As shown at step 150, determining whether the channel has at least one characteristic of a loudspeaker may comprise determining whether the channel has ripple in a pass-band thereof. For example, this may comprise applying a Welch periodogram to the channel, and determining whether there is a predetermined amount of ripple in the characteristic. A degree of ripple (that is, a difference between $\beta_1$ and $\beta_2$ in the frequency response shown in FIG. 10) exceeding a threshold value, such as 1 dB, and with a peak-to-trough frequency of about 100 Hz, over the central part of the pass-band, for example from 100 Hz-10 kHz, can be regarded as characteristic of a loudspeaker.

For example, two or three of the steps 146, 148 and 150 may be performed, with the results being applied to a classifier, to determine whether the results of those steps are indeed characteristic of a loudspeaker frequency response.

As a further example, the channel frequency response can be applied as an input to a neural network, which has been trained to distinguish channels that are characteristic of loudspeakers from other channels.

If it is determined that the channel has a characteristic of a loudspeaker, then it may be determined, perhaps on the basis of other indicators too, that the received audio signal is the result of a replay attack. In that case, the speech in the received audio signal may be disregarded when attempting to verify that the speaker is the expected enrolled speaker.

The skilled person will recognise that some aspects of the above-described apparatus and methods may be embodied as processor control code, for example on a non-volatile carrier medium such as a disk, CD- or DVD-ROM, programmed memory such as read-only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog TM or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of analysis of an audio signal, the method comprising:
   receiving an audio signal representing speech;
   extracting first and second components of the audio signal representing voiced and unvoiced speech respectively;
   analysing the extracted first component of the audio signal with a first model of voiced speech of an enrolled user and the second component of the audio signal with a second model of unvoiced speech of the enrolled user;
   based on said analysing, determining at least one of a property of a channel affecting the first and second components of said audio signal and a property of noise affecting the first and second components of said audio signal; and
   compensating the received audio signal for the property of the channel and/or the property of noise.

2. A method according to claim 1, wherein extracting first and second components of the audio signal comprises:
   identifying periods when the audio signal contains voiced speech; and
   identifying remaining periods of speech as containing unvoiced speech.

3. A method according to claim 1, wherein analysing the first and second components of the audio signal with the first and second models of the speech of the enrolled user comprises:
   comparing magnitudes of the audio signal at a number of predetermined frequencies with magnitudes in the first and second models.

4. A method according to claim 1, comprising:
- performing a speaker identification process on the received audio signal to form a provisional decision on an identity of a speaker;
- selecting the first and second models of the speech of the enrolled user, from a plurality of models, based on the provisional decision on the identity of the speaker;
- compensating the received audio signal for channel and/or noise; and
- performing a second speaker identification process on the compensated received audio signal to form a final on the identity of the speaker.

5. A method according to claim 4, wherein compensating the received audio signal for channel and/or noise comprises:
- identifying at least one part of a frequency spectrum of the received audio signal where a noise level exceeds a threshold level; and
- ignoring the identified part of the frequency spectrum of the received audio signal when performing the second speaker identification process.

6. A system for analysis of an audio signal, the system comprising:
- an input for receiving an audio signal; and
- one or more processors configured to:
  - receive an audio signal representing speech;
  - extract first and second components of the audio signal representing voiced and unvoiced speech respectively;
  - analyse the extracted first component of the audio signal with a first model of voiced speech of an enrolled user and the second component of the audio signal with a second model of unvoiced speech of the enrolled user;
  - based on said analysis, determine at least one of a property of a channel affecting the first and second components of said audio signal and a property of noise affecting the first and second components of said audio signal; and
  - compensate the received audio signal for the property of the channel and/or the property of noise.

7. A non-transitory computer readable storage medium having computer-executable instructions stored thereon that, when executed by processor circuitry, cause the processor circuitry to perform a method according to claim 1.

* * * * *